United States Patent [19]

Anthon

[11] Patent Number: 4,538,913
[45] Date of Patent: Sep. 3, 1985

[54] FLATNESS TESTING APPARATUS AND METHOD

[75] Inventor: Erik W. Anthon, Santa Rosa, Calif.

[73] Assignee: Optical Coating Laboratory, Inc., Santa Rosa, Calif.

[21] Appl. No.: 98,624

[22] Filed: Nov. 29, 1979

Related U.S. Application Data

[63] Continuation of Ser. No. 918,073, Jun. 22, 1978, abandoned, which is a continuation of Ser. No. 751,050, Dec. 15, 1976, abandoned.

[51] Int. Cl.³ .............................................. G01B 11/30
[52] U.S. Cl. ................................. 356/371; 250/237 G
[58] Field of Search ..................... 356/371; 250/237 G

[56] References Cited

U.S. PATENT DOCUMENTS

| | | | |
|---|---|---|---|
| 3,600,588 | 8/1971 | Sayce | 356/395 |
| 3,614,212 | 10/1971 | Hock | 250/237 G |
| 3,761,179 | 9/1973 | Plummer et al. | 356/371 |
| 3,783,270 | 1/1974 | Kamachi | 250/237 G |

FOREIGN PATENT DOCUMENTS

| | | | |
|---|---|---|---|
| 213378 | 5/1968 | U.S.S.R. | 356/371 |

OTHER PUBLICATIONS

Altfather, K. W., "Image Assessment for the Automated Testing of Mirror Flatness", Conf.: Image Assessment & Specification, Rochester N.Y., May 20–22, 1974, pp. 207–212.

*Primary Examiner*—William H. Punter
*Attorney, Agent, or Firm*—Flehr, Hohbach, Test, Albritton & Herbert

[57] ABSTRACT

Flatness testing apparatus for testing the flatness of a surface of a body of material a source of substantially monochromatic light for producing a light beam. First and second reticles are provided which are capable of passing the light beam. Means is provided for sensing light from the light source after it has passed through the reticles. An objective lens is provided which is adapted to be disposed adjacent the surface of the body of material. A first lens is provided in front of the source of light for imaging the source of light onto the objective lens and a second lens is provided in front of the means for sensing light for imaging the objective lens onto the means for sensing light. A mirror is provided for receiving light from the light beam after it has passed through the first reticle and for reflecting light through the second reticle to the light sensing means. Means is provided for causing relative movement of the reticle images with respect to each other to cause modulation of the light beam in accordance with the flatness of the surface.

19 Claims, 13 Drawing Figures

X— CHANNEL

Y— CHANNEL

FLATNESS TESTING APPARATUS AND METHOD

RELATED APPLICATIONS

This application is a continuation of application Ser. No. 918,073 filed on June 22, 1978, now abandoned, which is a continuation of application Ser. No. 751,050 filed on Dec. 15, 1976 and now abandoned.

BACKGROUND OF THE INVENTION

There are many types of equipment and apparatus which utilize front surface mirrors in optical systems such as copying machines, microfilm printers and the like. Such front surface mirrors must have a high degree of flatness in order to perform their functions properly. Ground and polished plate glass has heretofore been used for this type of front surface mirrors. However, such glass is becoming obsolete and is becoming difficul to obtain. In many applications, this plate glass is being replaced by float glass which, however, does not have nearly as predictable flatness qualities as plate glass. It has been found because of this fact the yield of acceptable front surface mirrors made from float glass is very low, resulting in a waste of time and materials.

Flatness has traditionally been measured interferometrically and flatness requirements were normally expressed in interferometry terms, i.e., so many fringes over such an area. However, such an interferometry measurement has had a number of shortcomings. It is slow. By way of example, ten measurement per minute would be near the maximum for nearly any type of interferometry equipment heretofore available. Interferometry measurements require very accurate alignment. Generally, the test part in the measuring head must be aligned within two arc seconds before a clear (well defined) fringe pattern can be observed. Interferometry requires freedom from vibration because vibrations tend to obliterate the fringe patterns. Interferometry is not readily adaptable to measurement on large sheets of material. It is difficult to separate the fringe patterns produced by the back side when interferometry is performed on uncoated glass. Interferometry measurements require interpretation of fringe patterns which requires a skilled operator. It, therefore, can be seen that there is a great need for a different type of flatness testing apparatus which can overcome these limitations of interferometry.

SUMMARY OF THE INVENTION AND OBJECTS

The flatness testing apparatus is used for testing the flatness of a surface of a body of material and utilizes an objective lens which is adapted to be disposed adjacent the surface of a sheet of material. A source of substantially monochromatic light is utilized for producing a light beam. First and second light transmitting reticles having substantially identical patterns thereon are provided for passing the light beam. Means is provided for sensing light from the source. A lens is provided in front of the source of light for imaging the source of light onto the objective lens. A second lens is provided in front of the means for sensing light for imaging the objective lens onto the means for sensing light. A mirror is provided for receiving light from the source of light and passing it through the first reticle and for reflecting light through the second reticle and onto the light sensing means. Means is provided for causing relative movement between the reticle images with respect to each other to modulate the light beam so that it can be ascertained whether or not the image is sharp or blurred and to thereby ascertain the flatness of the surface.

In general, it is an object of the present invention to provide an apparatus and method for testing the flatness of a surface of a body of material which does not require the use of interferometry.

Another object of the invention is to provide an apparatus and method of the above character which is relatively fast.

Another object of the invention is to provide an apparatus and method of the above character which does not have critical alignment accuracy requirements.

Another object of the invention is to provide an apparatus and method of the above character which is relatively insensitive to machine vibration.

Another object of the invention is to provide an apparatus and method of the above character which can be utilized on large sheets of material.

Another object of the invention is to provide an apparatus and method of the above character which can distinguish between the first and second surfaces of glass.

Another object of the invention is to provide an apparatus and method of the above character which does not require interpretation of fringe patterns.

Another object of the invention is to provide an apparatus and method of the above character which will only function with respect to one surface of the sheet being measured.

Another object of the invention is to provide an apparatus and method of the above character which uses ultra-violet for the light beam.

Another object of the invention is to provide an apparatus and method of the above character which can make measurements in several directions.

Another object of the invention is to provide an apparatus of the above character which is easy to operate.

Additional objects and features of the invention will appear from the following description in which the preferred embodiment is set forth in detail in conjunction with the accompanying drawing.

DESCRIPTION OF PREFERRED EMBODIMENT

The flatness testing apparatus as shown in the drawings consists of a pedestal and work stage assembly 11 which supports an optical head assembly 12. The pedestal assembly consists of a base 13 which is adapted to rest upon a suitable support such as a table or platform (not shown). The base 13 is provided with an upper surface 14 which is adapted to receive the part or body 16, the flatness of which is to be measured with the flatness testing apparatus. By way of example, the part or body 16 can be a sheet of glass which is provided with upper and lower surfaces 17 and 18 of which it is desired to test the flatness of the upper surface 18.

A vertically disposed tubular support member or pedestal 19 is mounted upon one portion of the base 13 in a suitable manner such as by welding the same to a reinforcing ring 21 which also is secured to the base 13 by suitable means such as a weldment. A pair of spaced apart members 22 and 23 are secured to the upper extremity of the tubular support member 19 by suitable means such as welding. A pair of support arms 24 and 26 are secured to the spaced apart members 22 and 23 and are adapted to carry the optical head assembly 12 as hereinafter described.

The optical head assembly 12 is a light tight housing and consists of first and second box-like structures 31 and 32 in which the box-like structure 31 carries a motor and tilting mirror parts as hereinafter described and the box-like structure 32 carries the optical parts. The two box-like structures 31 and 32 are fastened together by four heavy tie rods 33.

Figure 1:
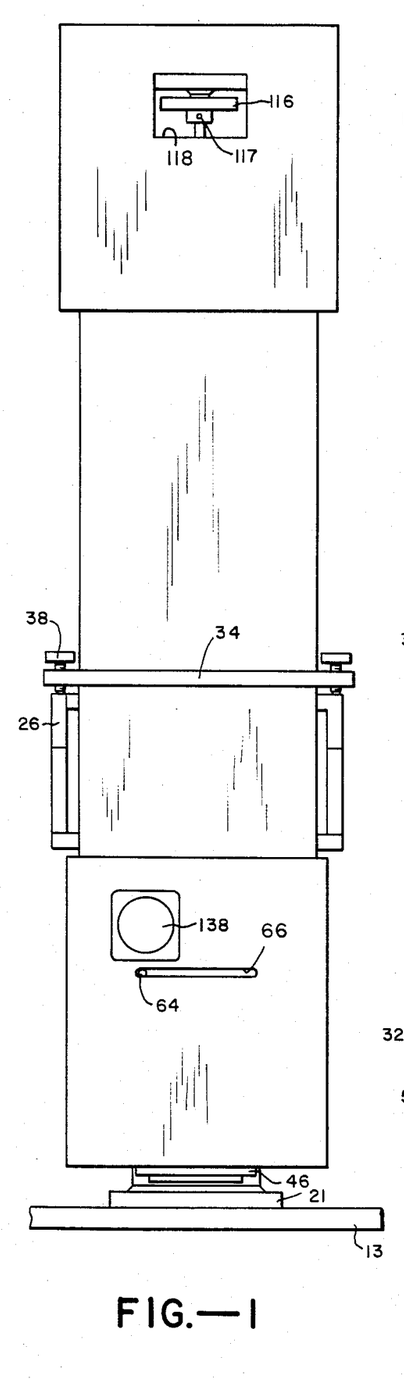
FIG. 1 is a front elevational view of a flatness testing apparatus incorporating the present invention.
Figure 2:
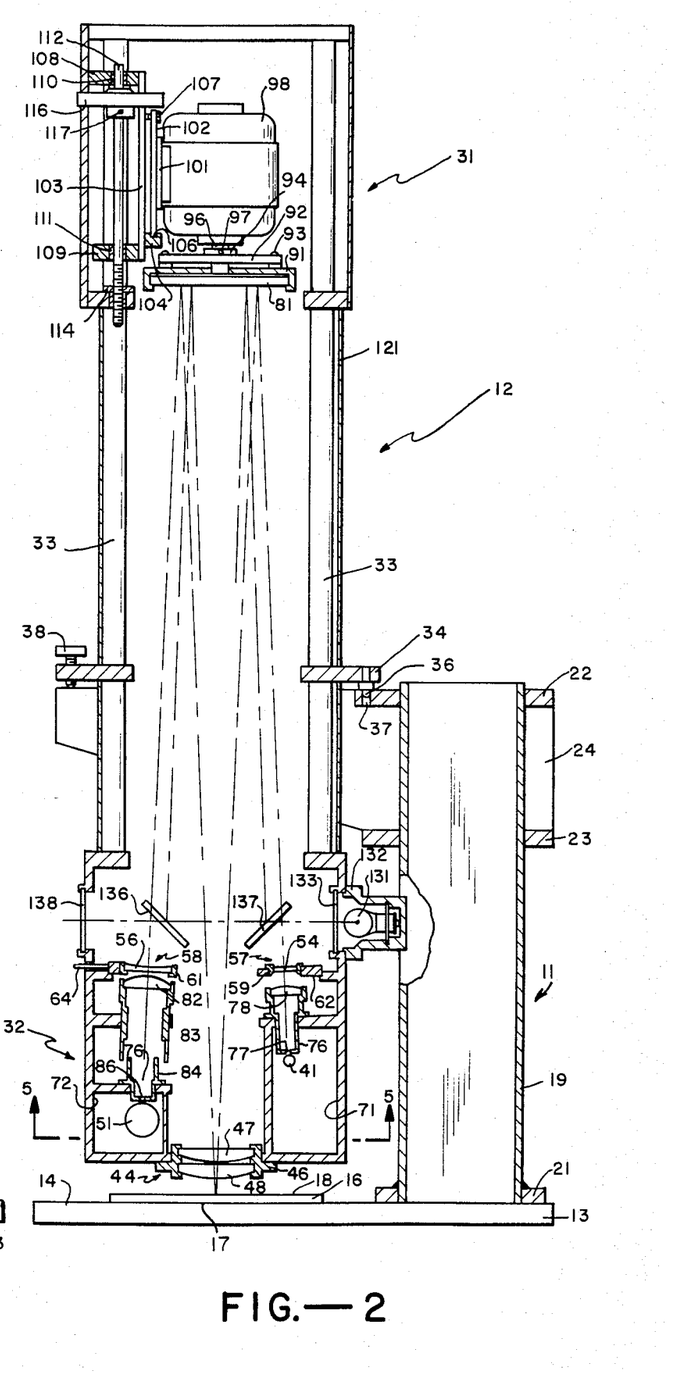
FIG. 2 is a cross-sectional view of the apparatus shown in FIG. 1.
Figures 3, 4:
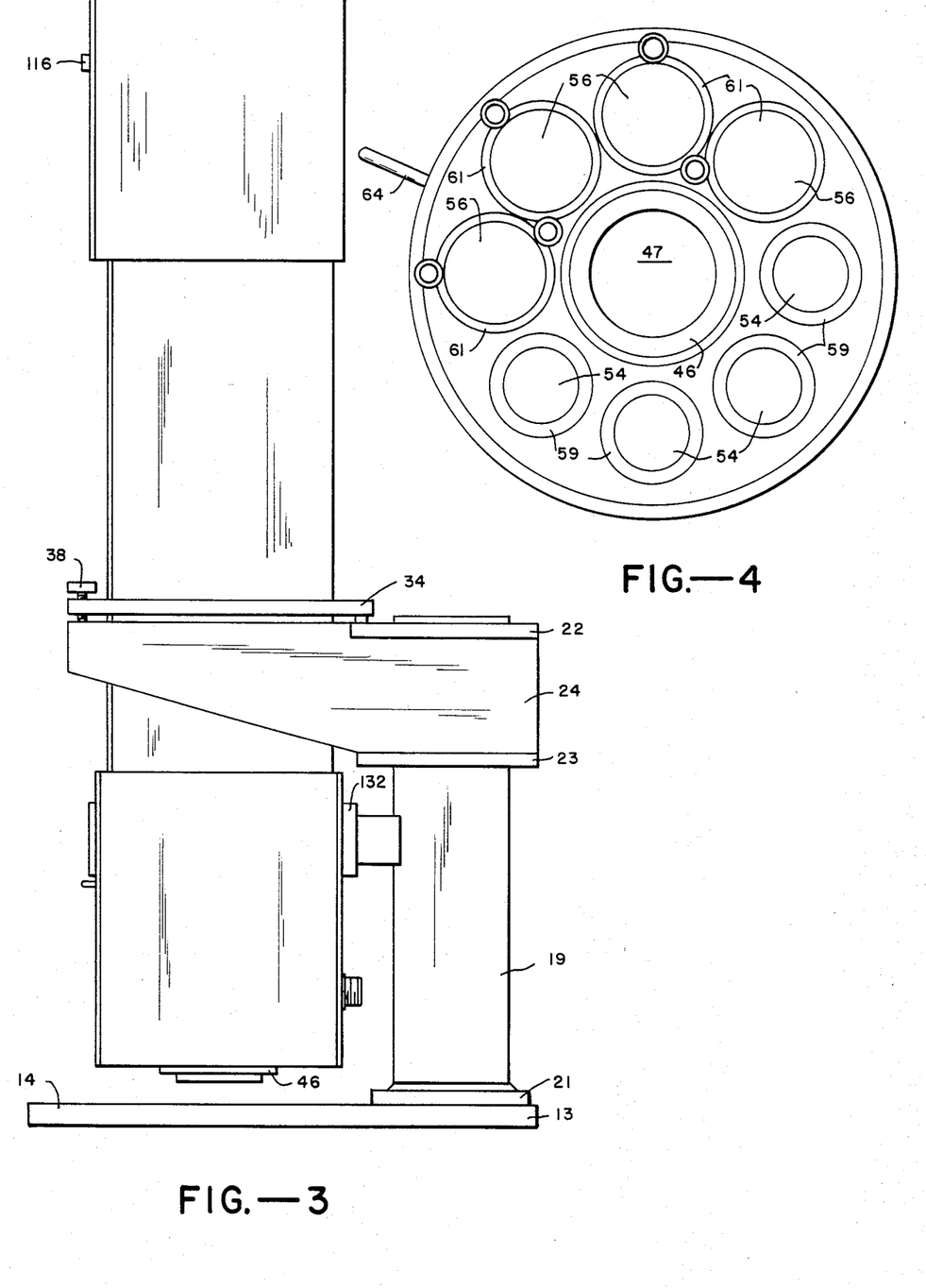
FIG. 3 is a side elevational view of the apparatus shown in FIGS. 1 and 2.
FIG. 4 is a view taken along reticle holding plate in the apparatus shown in FIG. 2.

A collar 34 is mounted upon the tie rods 33. Means is provided on the collar 34 for leveling the collar 34 with respect to the support arms 24 and 26 and consists of a pivot member 36 which is pivotally disposed within a hole 37 provided in the member 22 as shown in FIG. 2. A pair of leveling screws 38 are mounted approximately 120° apart from each other and from the pivot member 33 and engage the outer extremities of the support arms 24 and 26 are shown in FIGS. 2 and 3 and thereby provide in conjunction with the pivot member 36 a three-point support for the optical head assembly 12 so that the same can be leveled with respect to the pedestal and work stage assembly 11.

The box-like structure 32 is light-tight and is provided with means for forming a substantially monochromatic source of light for producing a light beam for use in the apparatus. Although means for producing a laser beam can be utilized, it has been found that there are other suitable sources. For example, it has been found that a conventional mercury lamp identified as the Pen-ray Quartz Lamp manufactured by Ultra-Violet Products, Inc. of San Gabriel, Calif., works satisfactorily. Such a lamp 41 is mounted in the structure 32. The light source 41 produces ultraviolet light rather than visible light. The source 41 is a low pressure mercury lamp which emits a line spectrum with about 90% of the energy in a line with a 253.7 nanometer wave length. Only energy in this line is utilized in the instrument. As can be seen, it is not necessary that absolutely all of the energy be in a single spectral line. The energy can be in other spectral lines. It is only necessary that the energy in the desired spectral line be intense and be relatively easy to isolate.

In this connection it should be appreciated that glass is not transparent to this wave length and thus only the top surface 18 will reflect the light because the bottom surface will be completely obscured. Since ultra-violet light is being utilized, the optical parts hereinafter described must be capable of transmitting ultra-violet light and for that reason a suitable material such as fused silica which transmits ultra-violet light of the 253.7 nanometer wave length must be used for the optical parts.

An objective lens assembly 44 is provided in the structure 32. It includes a framework 46 which is secured to the structure 32 by suitable means such as screws (not shown). A pair of plano-convex lenses 47 and 48 are mounted within the framework. As can be seen, the objective lens assembly 44 is placed close to the test surface 18. The aperture stop between the lens assembly 44 and the test surface defines the working aperture. By way of example, the aperture can have a 2 inch diameter. With a lens assembly 44 having an f number of 25, the lens assembly will have a resolution of approximately 2000 lines per inch at a wave length of 253.7 nanometers.

Means is provided for sensing light given off by the source 41 and consists of a conventional photomultiplier tube 51 which is mounted in the box-like structure 32 and which is only sensitive to ultra-violet light.

In order to obtain simultaneous measurement of flatness in two directions as, for example, X and Y directions, two lamps 41 and two photomultiplier tubes 51 mounted in perpendicular planes in the apparatus are required.

For each direction of measurement there are provided first and second reticles 54 and 56, which also can be identified as reticles A and B, respectively. The reticles 54 and 56 form a part of reticle assemblies 57 and 58, respectively, which include holders 59 and 61 that are removably mounted in a circular reticle holding plate 62 (see FIG. 4). The circular plate 62 is rotatably mounted upon arcuate flanged support members 63 forming part of the box-like structure 32. A handle 64 is secured to the plate 62 and extends through a slot 66 provided in the box-like structure 32 and permits indexing of the circular plate between two operating positions with one being at one end of the slot 66 and with the other being at the other end of the slot 66.

Figures 5, 6A, 6B:
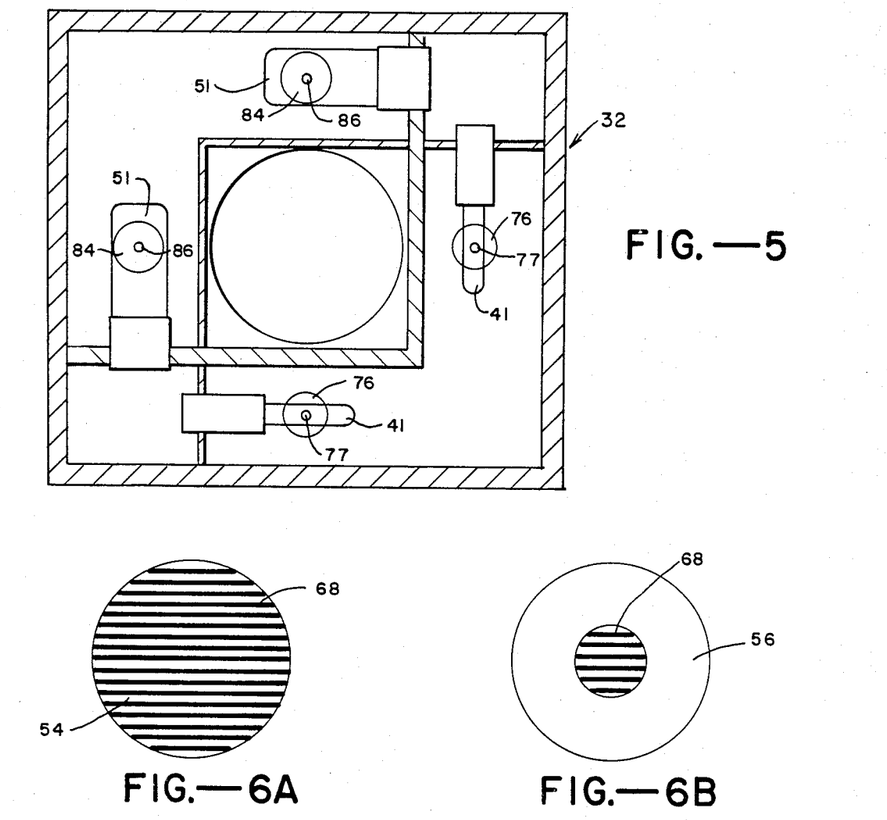
FIG. 5 is a cross-sectional view taken along the line 5—5 of FIG. 2.
FIGS. 6A and 6B and 7A and 7B show reticle configuration usable in the present invention.
Figure 7A:
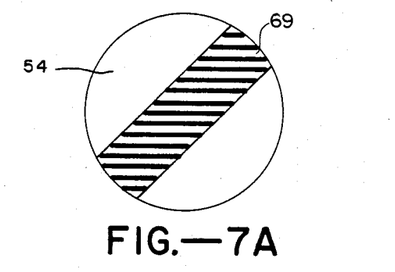
Figure 7B:
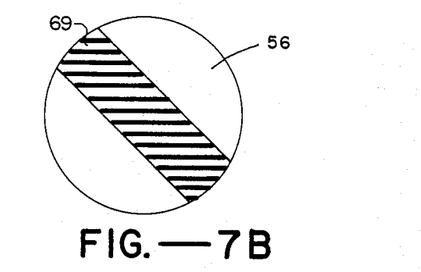

The reticle 54 or reticle A can be identified as the illuminated reticle, whereas reticle 56 or reticle B can be identified as the receiving reticle. As shown in FIGS. 6A and 6B, both have circular patterns 68 of identical stripes. As shown in the drawings, the pattern of reticle A is substantially larger than that of reticle B for a purpose hereinafter described. In FIGS. 7A and 7B an alternate pattern of configuration for the reticles 54 and 56 is shown. As shown therein, the patterns 69 are in the form of large stripes extending diagonally at an angle of approximately 45° across the reticle. The patterns 68 and 69 are comprised of very fine lines ranging from 50 to 250 line pairs per inch. In the patterns 68 and 69, the areas which are shown blackened on FIGS. 6 and 7 are transparent, whereas the lines therebetween are opaque as is the remaining area of the reticle.

It will be noted that the ultra-violet lamp source 41 is mounted within the light-tight compartment 71 and similarly the photomultiplier tube 51 is also mounted in a light-tight compartment 72 in the box-like structure 32.

Means 76 is provided having a small aperture 77 therein in proximity to the source 41 and which is adapted to receive light from the source and to permit it to pass through. The means 76 also includes a plano-convex condensing or field lens 78 which collimates the light rays passing through the aperture 77 before they pass through the first reticle 54. The light, after passing through the reticle 54, passes upwardly until it strikes a rotating wobble mirror 81 which reflects the light downwardly through the objective lens assembly 44 where it strikes the first surface 18 of the test article 16 and reflects the light rays back through the objective lens assembly 44 up to a wobble mirror 81 and then down through the second reticle 56 and through a plano-convex collimating lens 82 which is carried by holder 83 carried by the box-like structure 32. The light then passes through an aperture forming member 84 which is provided with an aperture 86 that immediately overlies the photomultiplier tube 51.

The wobble mirror 81 is a first surface reflector and must be of high optical accuracy. It is a plane mirror which is tilted approximately 10 minutes of arc relative to said plane perpendicular to its axis of rotation. The wobble mirror serves as means for causing relative movement between the image of the illuminated reticle and the receiving reticle to modulate the light beam. The wobble mirror 81 is carried by a holder 91 which is secured to a plate 92 by suitable means such as screws 93. The plate 92 is provided with a hub 94 which is secured to the output shaft 96 by set screw 97. The output shaft 96 is driven by a motor 98 which is mounted in the upper box-like structure 31. The motor 98 is provided with a base 101 which is secured to base plate 102. The motor 98 is of the a.c. reluctance type and achieves synchronous phase locking rotation when in use.

The base plate 102 is mounted upon a support plate 103. The support plate is provided with a bar 104 which has a slot 106 therein which receives one end of the plate 102. The other end of the plate 102 is secured to the plate 103 by screws 107. This permits adjustment so that the motor shaft 96 is vertically aligned. The support plate 103 is carried by a pair of members 108 and 109 which carry a thrust bearing 110 and bushing 111, to receive a rotatable lead screw 112. The lower end of the lead screw 112 is threaded into a threaded bushing 114 which is carried by the box-like structure 31. An adjustment wheel 116 is mounted on the lead screw 112 and is secured thereto by a set screw 117. The adjustment wheel 116 extends through a large opening 118 provided in the box-like structure 31 which permits engagement of the adjustment wheel by the hand and also permits vertical movement of the wheel as the lead screw is adjusted upwardly and downwardly by rotation of the same and at the same time carries the motor 98 upwardly and downwardly and thereby positions the mirror 81 for focusing purposes. The box-like structure 31 is also light-tight. An additional housing 121 extends between the two structures 31 and 32 and encloses the tie rods 33 and makes the entire optical head assembly 12 light-tight.

In operation of the apparatus in performing the method as hereinafter described, the apparatus must be carefully aimed at the surface being tested. The ultraviolet light which is being utilized in the instrument is unsuitable for aiming purposes for use with the human eye. For that reason, a second source of light in the form of an incandescent lamp 131 has been provided in a housing 132 secured to the exterior of the structure 32. A member 133 is mounted in the structure 32 through which the light from the source 131 is to pass. The member 133 includes a reticle as well as an ultra-violet blocking filter. The light from the source 131, after it passes through the member 133, strikes a mirror 136 which is supported by a support member (not shown) forming a part of the structure 32. The light, after striking the mirror 136, is reflected up to the wobble mirror 81 and then is reflected through the objective lens assembly 44, down to the test surface 18, then is reflected back through the objective lens assembly 44 up to the wobble mirror 81 and then back down to another mirror 137 which is also supported by a support structure (not shown) forming an integral part of the box-like structure 32. After striking the mirror 137, the light is directed through a member 138 mounted on the exterior wall of the structure 32 which serves as a frosted glass screen which can be viewed by the operator of the apparatus.

Thus, it can be seen that the objective lens assembly 44, the test part surface 18, the wobble mirror 81 and the two additional flat mirrors 136 and 137 form the projection path. Centering the image of the reticle carried by the member 133 on the frosted screen 138 assures proper alignment of the instrument or apparatus with the test surface. The filter which forms a part of the member 133 excludes ultra-violet light placed in front of the reticle and makes it possible to leave the aiming light 131 on at all times without interfering with the measurements to be performed by the apparatus.

As hereinbefore explained, for making simultaneous measurements of flatness in two directions or along two lines extending at an angle with respect to each other, it is necessary to provide two sets of lamps, two photomultipliers, two sets of collimating lenses and reticles, but sharing the same objective lens, which are mounted in perpendicular planes in the instrument or apparatus with respect to each other.

Figure 9:
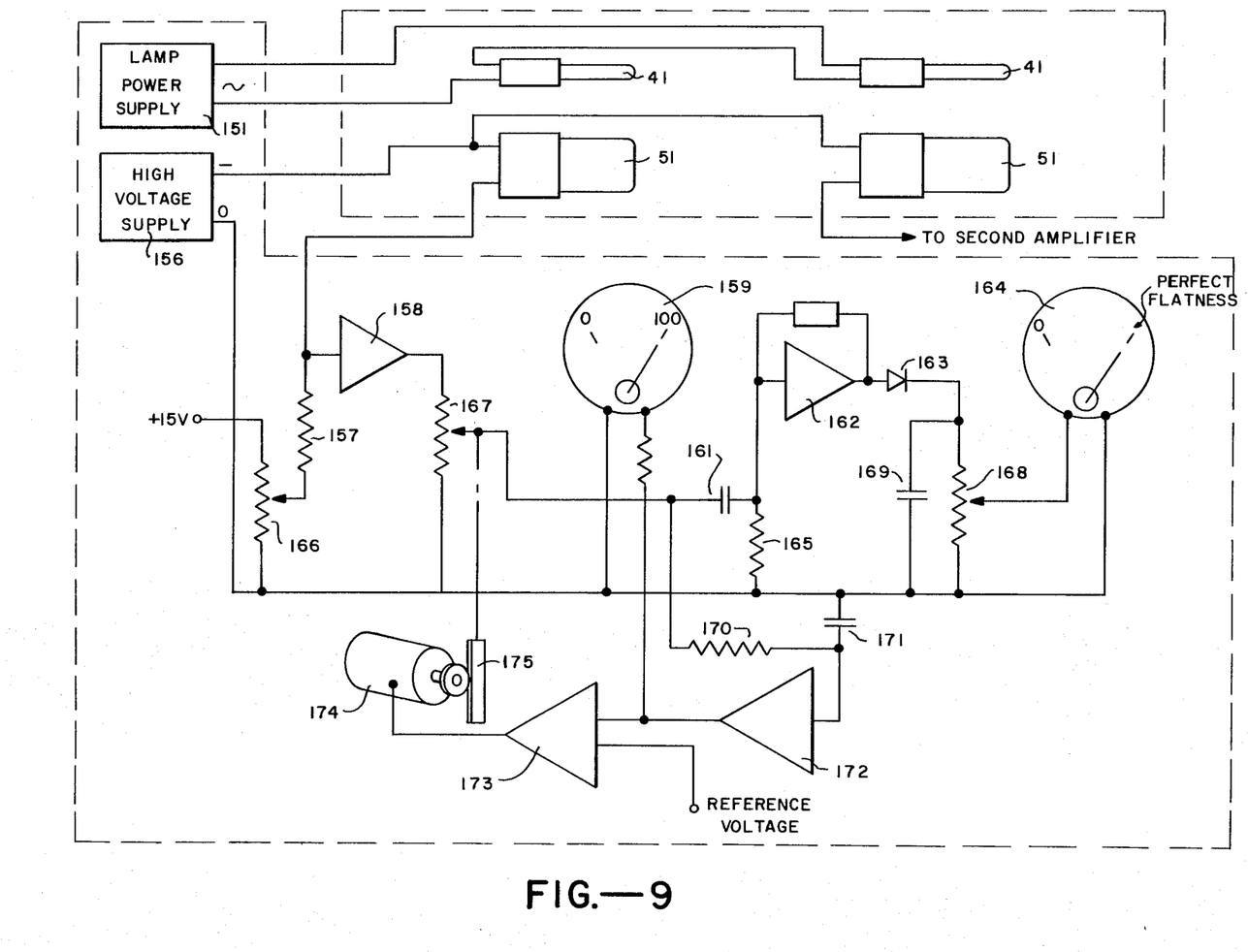
FIG. 9 is a block diagram of the electronic circuitry utilized in the apparatus.

The electronic circuitry for use in the apparatus is shown in FIG. 9. As shown therein, it consists of a lamp power supply 151 which supplies power to the lamps 41. A high voltage supply 156 is provided for supplying power to the photomultiplier tubes 51. The outputs of the photomultiplier tubes 51 are supplied to two different channels of electronics, only one of which is shown in the drawing. The wave form of the output signal from the photomultiplier 51 is shown on FIG. 10. The waveform is rather complex and can best be described as a 120 cycle wave upon which is superimposed a high frequency modulation of varying frequency. The mercury lamps 41 are operated on ac which has been found to be the most satisfactory. The lamps turn on every half cycle of the alternating current and are off between the half cycles. This causes the 120 cycle component of the output signal.

The high frequency modulation of the signal is caused by the interaction between the stripes on the receiving reticle 56 and the stripes in the image of the illuminated reticle 54 formed on the receiving reticle. The tilt of the wobble mirror 81 causes the reticle image to move in a small circular orbit on the receiving reticle 56. The motion of the image causes the transmitted light beam and thereby the output from the photomultiplier 51 tube to be modulated.

The frequency of the modulation depends on the number of stripes per inch in the reticle, the diameter of the circular orbit, the rotational speed of the rotating mirror and the direction of the motion of the reticle image relative to the direction of the reticle stripes.

The modulation frequency is maximum when the motion is perpendicular to the stripes and it is minimum when the motion is parallel to the stripes. Two maxima and two minima occur during one revolution. The rotation of the rotating mirror is timed such that both the frequency maxima and minima occur between half-cycles of the alternating current when the mercury lamps 41 are off. The motor 98 that drives the mirror makes one quarter revolution per half cycle of alternating current, which corresponds to 30 full revolutions per second or 1800 RPM.

With mirror 81 rotating at 1800 RPM, the diameter of the circular orbit 0.4 inches and the reticle patterns ranging from 50 to 250 lines per inch, the maximum modulation frequencie will range from 2 KC to 10 KC.

The amplitude of the high frequency modulation varies with the 120 cycle component of the signal. The maximum modulation amplitude depends on the intensity of the light reflected off the test surface 18, the sensitivity of the photomultiplier and the sharpness of the reticle image. The sharpness of the reticle image depends on the focusing of the instrument and on the flatness of the test surface.

The amplitude of the 120 cycle component of the signal depends on the intensity of the light received by the photomultiplier and the sensitivity of the photomultiplier. It is independent of the image sharpness and the high frequency modulation. The intensity of the light received by the photomultiplier is composed of the light reflected off the test surface and light reflected off internal surfaces in the instrument, notably the lens surfaces. The average signal level depends on the amplitude of the 120 cycle component of the signal and the dark current of the photomultiplier tubes. It is independent of the high frequency modulation of the signal.

Figure 10:
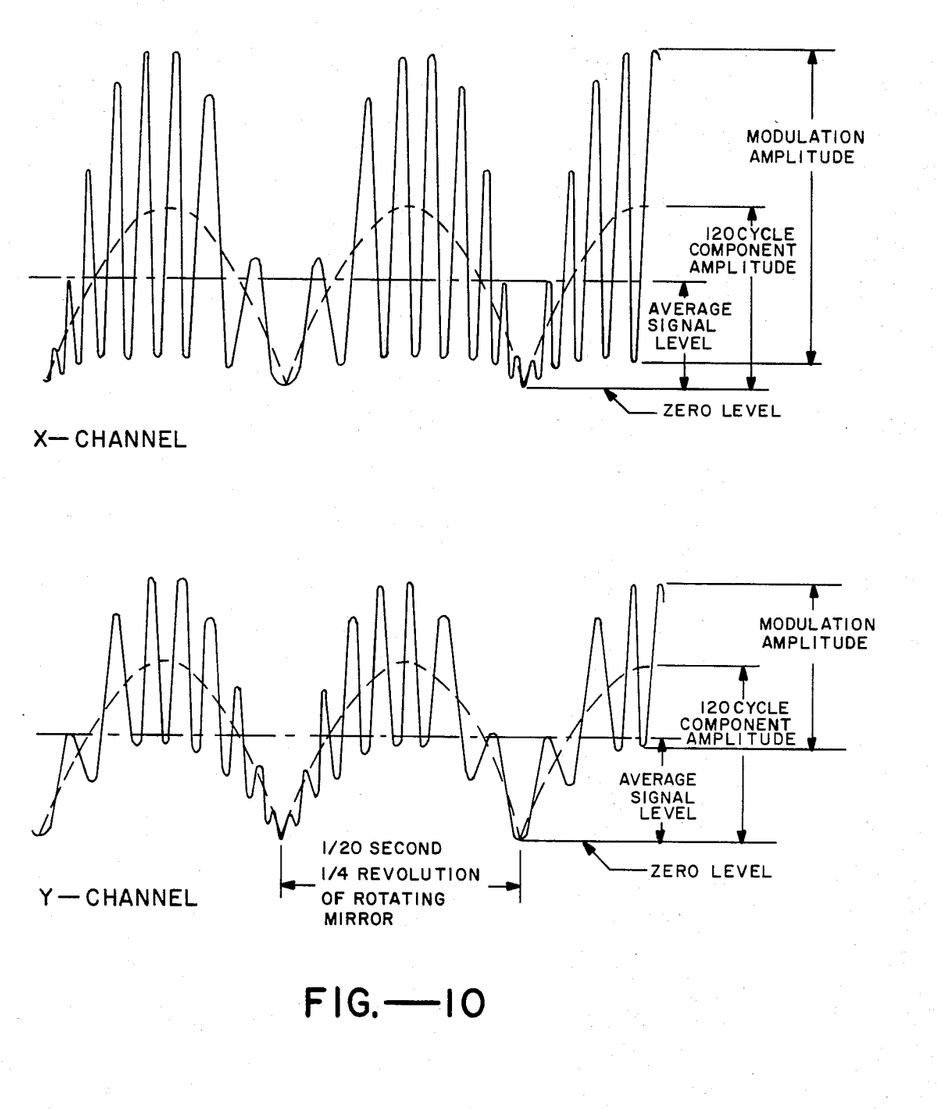
FIG. 10 is a diagram showing the output signals from the X and Y channels of the circuitry shown in FIG. 9.

FIG. 10 shows the output signal from both the x and y channel photomultiplier. The output signals are shown having the same 120 cycle component amplitude and the same average signal level but different modulation amplitude. This could be the case if the test surface 18 is flatter in the direction of the x-axis than in the direction of the y-axis.

The minimum modulation frequency occurs in the x-channel when the maximum modulation frequency occurs in the y-channel. After 1/120th of a second corresponding to 90° rotation of the mirror 81, this condition is reversed. The signal from the photomultiplier 51 is always negative. The negative direction is up in FIG. 10.

The signal from each photomultiplier 51 is processed in the electronic circuitry as described below. The signal develops across resistor 157. A positive bias voltage, adjustable by potentiometer 166 is added to the signal to compensate for the portion of the signal caused by the light reflected off internal surfaces in the instrument and dark current in the photomultiplier 51. The compensated signal is amplified in the operational amplifier 158.

The potentiometer 166 is adjusted such that the average output signal from the operational amplifier 158 is zero when the test surface 18 is not present and the signal from photomultiplier produced exclusively by dark current and by light reflected off internal surfaces in the optical head. The average level of the output signal from the amplifier 158 will, when the test surface 18 is present, be proportional to the reflectivity of the test surface 18.

Of the signal from amplifier 158, a portion, which depends on the setting of potentiometer 167, is fed to the operational 172 thru a filter network consisting of resistor 170 and capacitor 171. The network filters out both the 120 cycle component and the high frequency component of the signal and allows only the average level of the signal to be amplified in amplifier 172.

The amplified signal is measured on the voltmeter 159. The potentiometer 167 is set such that the voltmeter 159 reads full scale (100) when the test surface 18 is present. The setting of potentiometer 167 will depend on the reflectivity of the test surface 18. The setting may be done manually or it may be done with a servo system as shown on FIG. 9.

The output from amplifier 172 together with a reference voltage is fed to the difference amplifier 173. The output from the difference amplifier 173 drives the servomotor 174 which through the gearing 175 adjusts the setting of the potentiometer 167. The reference voltage is made equal to the voltage that produces full scale reading on the voltmeter 159. The servomotor will drive the potentiometer 167 until the output from the amplifier 172 equals the reference voltage.

The servo system will assure that the average signal remains constant at the wiper of the potentiometer regardless of the reflectivity of the test surface 18. This normalized signal is fed to the amplifier 162 thru a filter network consisting of the capacitor 161 and the resistor 165. The filter network passes only the high frequency modulation component of the signal while it blocks the d.c. component and the 120 cycle component of the signal. The high frequency modulation component of the signal is amplified in amplifier 162 and rectified in the rectifier 163.

The amplitude of the high frequency modulation and thereby the voltage of the rectified signal is a function of the resolution of the reticle image and can therefore be used to measure the flatness of the test surface 18.

The amplitude of the high frequency modulation is not a function of the reflectivity of the test surface 18 since changes in signal caused by variation in reflectivity are compensated for by either manual or servo adjustment of potentiometer 166. The rectified signal is smoothed by capacitor 169 and fed to potentiometer 168.

A portion of the signal is fed to the flatness meter 164. The potentiometer 168 is adjusted such that full scale reading is obtained on the flatness meter 164 when a perfectly flat test surface 18 is in place and the system is focused for best resolution. Any test surface 18 which is less than perfectly flat will produce less resolution and therefore less signal and smaller reading on the flatness meter 164.

The degree of flatness of the test part can be read directly on the flatness meter 164. The scale of this meter can be calibrated in "fringes per inch" by measuring a perfectly flat part with appropriate defocusing of the rotating mirror.

The potentiometer 166 is adjusted such that the average signal level output from amplifier 158 and thereby the reading on voltmeter 159 is zero when the test surface 18 is not present. Re-adjustment of potentiometer 166 may be required from time to time if the intensity of the lamps 41 varies or if the sensitivity of the photomultiplier tubes 51 varies. The potentiometer 166 may be adjusted manually or it may be adjusted by a servomechanism similar to the one used for adjustment of potentiometer 167. The servomechanism must be operated intermittently during periods when no light is reflected off the test surface 18. This may be done either when the test surface 18 is not present or when a non reflecting shutter (not shown) is interposed between the test surface 18 and the objective lens 44.

Operation and use of the flatness testing apparatus in performing the method of the present invention may now be briefly described as follows. Let it be assumed that the apparatus has been calibrated by utilizing a test plate with a perfectly flat surface. The motor 98 carrying the wobble mirror 81 is adjusted by use of the hand wheel 116 to focus the objective lens assembly 44 for maximum resolution, that is, maximum signal amplitude. The gain is adjusted by adjustment of the potentiometer 167 to produce a full scale reading on the sensitivity meter 159. The objective lens assembly 44 is then defocused by adjustment of the vertical position of the motor 98 to reduce the reading from full scale to 0.9, 0.8, 0.7 etc. times full scale. This same procedure is repeated for each of the two sets of reticles. One millimeter defocusing of the objective lens assembly corresponds with the chosen parameters to 1.3 millidiopters. Calibration curves which convert signal amplitude readings to millidiopters can be made for each set of reticles. Flatness specifications are generally given in fringes over a given diameter but also may be given in millidiopters. Fringes and millidiopters are proportional. 14 millidiopters correspond to 8 fringes over a 2 inch diameter or 2 fringes over a 1 inch diameter. Fringes are measured at the 546 nanometer wave length.

For operation of the flatness testing apparatus, a reticle set must be selected that will give a good reading (somewhere between 0.25 and 0.50 times full scale) when the specified limit for flatness is reached. This can be determined from the calibration curves. The objective lens assembly 44 must be focused for maximum resolution and the gain must be adjusted to give full scale readings when the perfectly flat test plate is placed in the beam.

The flatness testing apparatus or instrument measures image resolution. An image of the illuminated reticle A is formed on top of the receiving reticle B. The imaging optics consist of the objective lens assembly 44, the flat wobble mirror 81 and the test surface 18. The optical components have been designed for perfect (diffraction limited) imaging and the optical quality of these parts should be an order of magnitude better than the surface of the test part.

Because of the wobbling motion of the mirror 81, the image of the illuminated reticle A is caused to move about in a small circle in relation to the receiving reticle B. The smaller size of reticle B with respect to reticle A permits modulation to occur and accomodates misalignment of the test object. Light is transmitted through the receiving reticle to the photomultiplier tube 51 when the image of the clear stripes of reticle A fall right on top of the clear stripes of reticle B. Less light will be transmitted as the image of clear stripes of reticle A moves onto the opaque stripes of reticle B.

The motion of the reticle image will, therefore, cause light received by the photomultiplier tube to be modulated. The transparent stripes and the opaque stripes have the same width and the light would be turned fully on and off (100% modulation) if the image of the stripes in reticle A on reticle B is perfect. The modulation will be less than 100% if the image is degraded or blurred as would be the case if the test part surface which is part of the imaging system were not perfectly flat. The degree of modulation of the light beam and thereby the output signal from the photomultiplier tube provides a measure of flatness of the test surface.

Focusing the imaging from the first reticle to the second reticle is accomplished by vertical movement or movement parallel to the axis of the shaft of the motor 98 to affect the distance between the optical image and the objective lens assemb 44.

Figure 8A:
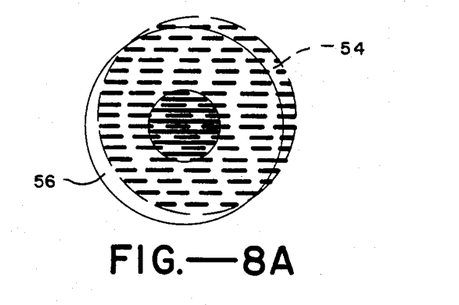
FIGS. 8A and 8B are views showing the relative recticle image and reticle positions for the two different reticle configurations shown in FIGS. 6A and 6B and 7A and 7B.

The formation of the image from reticle A on top of reticle B is shown in FIG. 8A. Light will only pass through the reticles in the small area where the two patterns overlap and there only light will pass through where the clear areas of both patterns are superimposed.

Figure 8B:
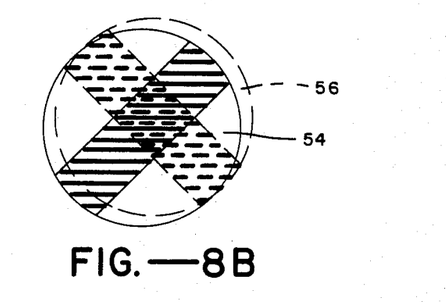

The same is true with respect to the pattern used on the reticles shown in FIG. 8B. Light will only pass through the two reticles in the small square area where the two patterns overlap and the light will only pass through where the clear areas of both patterns are superimposed.

The light information received by the ultra-violet sensitive photomultiplier 51 is supplied through both channels of electronic circuitry as shown in FIG. 9 and provides the X and Y channel signals shown in FIG. 10.

When the measurements have been made in one set of reticles, another set of reticles can be utilized merely by movement of the handle 64 in the slot 66 to the other extreme position. Also, it should be appreciated that, if desired, still additional sets of reticles can be provided as, for example, three sets of reticles to provide sufficient gradations between sizes.

From the foregoing it can be seen that the optical system is built into a rigid light-tight housing. The lamps and photomultiplier tubes are mounted in separate compartments.

For operation of the instrument or apparatus, a reticle set must be selected that will give good reading (somewhere between 0.25 and 0.50 times full scale) when the specified limit for flatness is reached. The objective lens 44 should be focused for maximum resolution and the gain adjusted to give full scale readings when a perfectly flat test plate is placed in the beam. The part to be measured is slid under the instrument and the leveling mounts are adjusted and readings of the X and Y signal amplitudes are taken. The signal amplitude will drop below the predetermined value when the limit for flatness is exceeded.

It should be noted that the signal amplitude is unaffected by variations in reflectance of the surface. Accidental defocusing of the objective lens can only cause reduction in the signal amplitude. The risk of having the instrument accept material that it should have rejected is greatly reduced by these factors.

From the foregoing it can be seen that the flatness testing apparatus can be utilized to replace the interferometer for checking finished parts. It is faster and less strenuous to use. The flatness testing apparatus can also be utilized for checking the flatness of full size sheets, coated or uncoated. This makes it possible to reduce coating costs and also makes it possible to cut out unsuitable material. The flatness testing apparatus is relatively insensitive to vibration and operates at a high rate, and, therefore, can be mounted directly on a machine checking the flatness of glass as the glass moves through a stage in which the apparatus is mounted.

The flatness testing apparatus will have many other advantages. It will be fast. The required alignment accuracy will be in the order of 10 minutes of arc. It will not be very sensitive to vibration and can be utilized in connection with machinery. The apparatus will make it possible to distinguish between the two surfaces of a sheet of glass and will make measurements on uncoated glass possible without the necessity of interpretation of fringe patterns.

What is claimed is:

1. In an apparatus for testing the flatness of the surface of a body of material, a source of light for producing a light beam, a first light transmitting reticle passing the light beam, a second light transmitting reticle passing the light beam, an objective lens adapted to be disposed adjacent the surface of an object, a lens in front of the source of light for imaging the source of light onto the objective lens, means for sensing light from said source, a lens in front of the means for sensing light for imaging the objective lens onto the means for sensing light, a mirror for receiving light from the source of light passing through the first reticle and reflecting the received light through the objective lens onto the surface of the body and receiving light reflected from the surface of the body and reflecting the light received from the surface of the body through the second reticle and onto the light sensing means, means for focusing the image from the first reticle onto the second reticle and means for causing relative movement of the image of the first reticle and the second reticle with respect to each other to modulate the light beam received by the means for sensing light to ascertain the flatness of the surface of the object.

2. Apparatus as in claim 1 wherein said source of light is a substantially monochromatic ultra-violet source.

3. Apparatus as in claim 1 wherein one of said reticles has a size substantially smaller than the size of the other reticle.

4. Apparatus as in claim 3 wherein said reticles are formed by patterns of line pairs.

5. Apparatus as in claim 4 wherein said patterns are generally circular in which one pattern is substantially smaller than the other pattern.

6. In an apparatus for testing flatness of the surface of a body of material, a source of substantially monochromatic light for producing a light beam, a first light transmitting reticle passing the beam of light, a second light transmitting reticle passing the light beam, an objective lens adapted to be disposed adjacent the surface of an object, a lens in front of the source of light for imaging the source of light onto the objective lens, means for sensing light from said source, a lens in front of the means for sensing light for imaging the objective lens onto the means for sensing light, a mirror for receiving light from the source of light passing through the first reticle and reflecting the received light through the objective lens onto the surface of the body and receiving light reflected from the surface of the body and reflecting the light received from the surface of the body through the second reticle and onto the light sensing means, means for forcusing the image from the first reticle onto the second reticle and means for causing relative movement of the image of the first reticle and the second reticle with respect to each other to modulate the light beam received by the means for sensing light to ascertain the flatness of the surface of the object, said means for causing relative movement including means for rotating the mirror and means for mounting the mirror so that it is tilted slightly from the plane which is perpendicular to the axis of rotation for the mirror.

7. Apparatus as in claim 6 together with means for causing relative movement along the line extending between the mirror and the objective lens for focusing the image of the first reticle onto the second reticle.

8. Apparatus as in claim 1 wherein additional first and second reticles, an additional source of light, and an additional means for sensing light are provided and which are arranged along a line at an angle with respect to a line extending through the first named first and second reticles to provide measurements of flatness of the surface of the body of material along two lines which extend at an angle with respect to each other.

9. Apparatus as in claim 8 wherein said two lines extend at 90° with respect to each other to provide measurements along X and Y axes.

10. Apparatus as in claim 1 together with electronic circuitry connected to the means for sensing light and including means for ascertaining a characteristic of modulation to thereby Provide a measure of flatness of the surface.

11. Apparatus as in claim 8 together with first and second channels of electronic circuitry coupled to the first named means for sensing light and to the additional means for sensing light to provide first and second measures of the amplitude of high frequency modulation of the first named and additional means for sensing light to provide simultaneous measures of flatness in two directions on the surface of the body.

12. Apparatus as in claim 1 together with visual means for aiming the apparatus at the body of material, said visual means including a source of light visible to the human eye, and means for receiving the light visible to the human eye and directing it onto the mirror, reflecting it from the mirror through the lens to the surface of the body and receiving the light reflected from the body onto the mirror and for directing the light so that it can be used by the viewer.

13. Apparatus as in claim 12 together with a reticle disposed in the beam of light supplied by the source of light visible to the human eye and a surface visible to the viewer for receiving the light reflected from the mirror.

14. Apparatus as in claim 13 together with ultra-violet filter means for blocking out ultra-violet energy from the source of light visible to the human eye.

15. Apparatus as in claim 1 together with a platform for supporting the body of material, a pedestal carried by the platform and a light-tight housing carried by the pedestal and enclosing said source of monochromatic light, said first and second reticles, said means for sensing light and said mirror.

16. In a method for testing the flatness of the surface of a body of material formed of glass utilizing first and second reticles, providing a source for a beam of light, causing the beam of light from the source to pass through the first reticle and to impinge in substantially collimated form by the use of a lens upon an area of the surface being tested and to pass through the second reticle so that the image of the first reticle is formed on the second reticle without the formation of an intermediate image of the first reticle, causing relative movement between the image of said first reticle and said second reticle to modulate the light beam, the sharpness of said image of said first reticle on said second reticle being relatively unaffected by changes in position of the test surface relative to the lens and being strongly affected by the degree of flatness of the test surface whereby when the test surface is flat, the image of the first reticle on the second reticle will be sharp and will produce a high level of modulation and when the test surface is uneven, the image of the first reticle on the second reticle will be less sharp and will produce a lower level of modulation, and sensing the amount of modulation of the light beam after it has passed through the first and second reticles to ascertain the flatness of the surface.

17. A method as in claim 16 wherein said source of light is substantially monochromatic ultra-violet light.

18. A method as in claim 16 utilizing additional first and second reticles together with the step of providing an additional source for a beam of light, causing the beam of light from the additional source to pass through the additional set of first and second reticles and to impinge in substantially collimated form by the use of a lens upon an area the surface being tested so that the image of the first reticle of the additional set of reticles is formed on the second reticle of the additional set of reticles without the formation of an intermediate image of the first reticle, causing relative movement between the image of said first one reticle of the additional set of reticles and said second reticle of the additional set of reticles to modulate the additional light beam, the sharpness of said image of said first reticle on said second reticle of the additional set of reticles being relatively unaffected by changes in position of the test surface relative to the lens and being strongly affected by the degree of flatness of the test surface whereby when the test surface is flat, the image of the first reticle on the second reticle of the additional set of reticles will be sharp and will produce a high level of modulation and when the test surface is uneven, the image of the first reticle on the second reticle of the additional set of reticles will be less sharp and will produce a lower level of modulation, and sensing the amount of modulation of the additional light beam after it has passed through the first and second reticles of the additional set of reticles to ascertain the flatness of the surface in another direction.

19. A method as in claim 17 together with the step of aiming the source of light onto the body of material by utilizing a separate aiming light visible to the human eye.

* * * * *